United States Patent
Ryu et al.

(10) Patent No.: US 12,465,927 B2
(45) Date of Patent: Nov. 11, 2025

(54) METHOD FOR DETECTING NANOPLASTICS IN ECOSYSTEM USING VERTICAL NANOGAP ELECTRODE AND RAMAN SPECTROSCOPY

(71) Applicant: KOREA INSTITUTE OF SCIENCE AND TECHNOLOGY, Seoul (KR)

(72) Inventors: Yong-Sang Ryu, Seoul (KR); Eui-Sang Yu, Seoul (KR); Eui Tae Jeong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 418 days.

(21) Appl. No.: 17/979,249

(22) Filed: Nov. 2, 2022

(65) Prior Publication Data

US 2023/0333083 A1    Oct. 19, 2023

(30) Foreign Application Priority Data

Apr. 18, 2022    (KR) ........................ 10-2022-0047704

(51) Int. Cl.
*B03C 5/02*    (2006.01)
*B82Y 15/00*    (2011.01)
*G01N 27/447*    (2006.01)

(52) U.S. Cl.
CPC .............. *B03C 5/022* (2013.01); *B82Y 15/00* (2013.01); *G01N 27/44791* (2013.01)

(58) Field of Classification Search
None
See application file for complete search history.

(56) References Cited

U.S. PATENT DOCUMENTS 9,358,380 B2    6/2016  Ivanoff et al.
2021/0086194 A1    3/2021  Ryu et al.
(Continued)

FOREIGN PATENT DOCUMENTS

JP    2007-51941 A    3/2007
JP    2015-210128 A    11/2015
JP    2016-99113 A    5/2016
(Continued)

OTHER PUBLICATIONS

Ertsgaard, et al., "Integrated Nanogap Platform for Sub-Volt Dielectrophoretic Trapping and Real-Time Raman Imaging of Biological Nanoparticles", Nano Letters, 18(9): p. 5946-5953, Aug. 2018.*

(Continued)

*Primary Examiner* — J. Christopher Ball
(74) *Attorney, Agent, or Firm* — NSIP Law

(57) ABSTRACT

A method for detecting a nanoplastic using a vertical nanogap electrode and a Raman spectroscopic device, includes, in a state where a vertical nanogap electrode is provided in aquatic environment in which a nanoplastic exists, forming a nanoplastic aggregate having a size of 1 μm or more by applying an alternating voltage of a specific frequency to the vertical nanogap electrode, and collecting and concentrating the nanoplastic in a collector of the vertical nanogap electrode, and performing Raman spectroscopy on the nanoplastic aggregate concentrated in the collector of the vertical nanogap electrode to detect the nanoplastic constituting the nanoplastic aggregate.

6 Claims, 26 Drawing Sheets

(56) References Cited

U.S. PATENT DOCUMENTS

2021/0364405 A1 11/2021 Hagendorf et al.
2021/0389228 A1 12/2021 Seo et al.

FOREIGN PATENT DOCUMENTS

| KR | 10-1589039 | B1 | | 1/2016 | |
|----|------------|----|---|--------|---|
| KR | 10-2017-0086990 | A | | 7/2017 | |
| KR | 10-2019-0111462 | A | | 10/2019 | |
| KR | 10-2060099 | B1 | | 12/2019 | |
| KR | 10-2134394 | B1 | | 7/2020 | |
| KR | 10-2020-0129732 | A | | 11/2020 | |
| KR | 10-2021-0015783 | A | | 2/2021 | |
| KR | 10-2254587 | B1 | | 5/2021 | |
| KR | 10-2347063 | B1 | | 1/2022 | |
| KR | 10-2362856 | B1 | | 2/2022 | |
| KR | 10-2443561 | B1 | | 9/2022 | |
| WO | WO 2017/181030 | A2 | | 10/2017 | |
| WO | WO-2019182186 | A1 | * | 9/2019 | ......... G01N 15/1056 |

OTHER PUBLICATIONS

Yu, et al., "Precise capture and dynamic relocation of nanoparticulate biomolecules through dielectrophoretic enhancement by vertical nanogap architectures", Nature Communications, 11(1): paper 2804, 9 pages + 38 page supplementary (Year: 2020).*

Korean Office Action issued on Sep. 10, 2024, in counterpart Korean Patent Application No. 10-2022-0047704 (1 page in English, 1 page in Korean).

Yu, Eui-Sang, et al. "Precise capture and dynamic relocation of nanoparticulate biomolecules through dielectrophoretic enhancement by vertical nanogap architectures." *Nature communications* vol. 11. Issue 1 (2020). pp. 1-9.

Yu, Eui-Sang, et al. "Nanoscale terahertz monitoring on multiphase dynamic assembly of nanoparticles under aqueous environment." *Advanced Science* vol. 8. Issue 11 (2021): 2004826. pp. 1-9.

Mintenig, S. M., et al. "Closing the gap between small and smaller: towards a framework to analyse nano- and microplastics in aqueous environmental samples." *Environmental Science: Nano* vol. 5. Issue 7 (2018). pp. 1640-1649.

Gagné, François, et al. "Detection of polystyrene nanoplastics in biological samples based on the solvatochromic properties of Nile red: application in Hydra attenuata exposed to nanoplastics." *Environmental Science and Pollution Research* vol. 26. Issue 32 (2019). pp. 33524-33531.

Lin, Yue, et al. "Thermal fragmentation enhanced identification and quantification of polystyrene micro/nanoplastics in complex media." *Talanta* vol. 208 (2020): 120478. pp. 1-8.

Gillibert, Raymond, et al. "Raman tweezers for small microplastics and nanoplastics identification in seawater." *Environmental science & technology* vol. 53. Issue 15 (2019). pp. 9003-9013.

Lv, Lulu, et al. "In situ surface-enhanced Raman spectroscopy for detecting microplastics and nanoplastics in aquatic environments." *Science of the Total Environment* vol. 728 (2020): 138449. pp. 1-8.

Schwaferts, Christian, et al. "Nanoplastic analysis by online coupling of Raman microscopy and field-flow fractionation enabled by optical tweezers." *Analytical chemistry* vol. 92. Issue 8 (2020). pp. 5813-5820.

Xu, Guanjun, et al. "Surface-enhanced Raman spectroscopy facilitates the detection of microplastics< 1 μm in the environment." *Environmental Science & Technology* vol. 54. Issue 24 (2020). pp. 15594-15603.

* cited by examiner

SEM

METHOD FOR DETECTING NANOPLASTICS IN ECOSYSTEM USING VERTICAL NANOGAP ELECTRODE AND RAMAN SPECTROSCOPY

DESCRIPTION OF GOVERNMENT-SPONSORED RESEARCH

This study was made with the support of the Ministry of Science and ICT [Project name: Development of filter and qualitative/quantitative analysis source technology for real-time measurement of on-site detection type nanoplasitics, Project number: 1711126596, Project sub-number: 2021R1A2C2009236].

CROSS-REFERENCE TO RELATED APPLICATION

The present application claims priority to Korean Patent Application No. 10-2022-0047704, filed Apr. 18, 2022, the entire contents of which are incorporated herein for all purposes by this reference.

BACKGROUND OF THE INVENTION

Field of the Invention

The present invention relates to a method for detecting nanoplastics using a vertical nanogap electrode and a Raman spectroscopic device, and more particularly, a method for detecting nanoplastics using a vertical nanogap electrode and a Raman spectroscopic device that can overcome diffusion limit and diffraction limit by collecting and concentrating the nanoplastics present in the water into an aggregate of micrometer size so as to enable the detection of nanoplastics through a Raman spectroscopic device.

Description of the Related Art

The plastic fragments introduced into the aquatic ecosystem go through microplastics with the size of 1 μm to 5 mm and then break down into nanoplastics with the size of 1 μm or less over time. These nanoplastics interact with organisms, and it has been recently reported that the nanoplastics are not only ingested but also penetrate the human body through cell membranes. In the current situation where little is known about the effects of nanoplastics on the human body and the environment, it is clear that there is a need to collect and analyze nanoplastics present in the aquatic ecosystem.

Nanoplastics are not only very small in size, but also exist at very low concentrations in the aquatic ecosystem (existing at the concentration of about 0.02 mg/L in seawater), so even the first step for capturing nanoplastics for analysis presents challenges. In addition, even if the nanoplastics are collected, it is not easy to detect the nanoplastics using a conventional analysis device due to their nanoscale size.

As the analysis device for detecting the nanoplastics, there are a dynamic light scattering (DLS), a nanoparticle tracking analysis (NTA), a mass spectrometry (MS), a Fourier-transform infrared (FT-IR) spectroscopic device, a Raman spectroscopic device, etc. The DLS and the NTA are suitable for monitoring a specific size and population, and the MS, the FT-IR spectroscopic device, and the Raman spectroscopic device have the advantage of enabling qualitative analysis such as chemical composition. However, the MS requires sample vaporization or a vacuum environment, and the FT-IR analysis is not easy due to absorption loss by water molecules in the infrared region and diffraction limit for particles smaller than 20 μm. On the other hand, the Raman spectroscopic device can be a strong candidate for the detection of nanoplastics in the aquatic ecosystem in that it can perform on-site aquatic detection.

Nevertheless, it is still difficult to detect nanoplastics by the Raman spectroscopic device because of the diffusion limit due to the presence of ultra-low concentrations of nanoplastics and the diffraction limit of the Raman spectroscopic device.

The Raman spectroscopic device has a problem of the diffraction limit in the particles of 500 nm or less. In order to detect the nanoplastics through the Raman spectroscopic device, not only the collection of the nanoplastics but also the concentration of the collected nanoplastics is required, and the concentrated nanoplastics are required to form an aggregate in micrometer unit.

Surface-enhanced Raman scattering (SERS) can be employed to overcome the low Raman scattering signal for the nanoplastics, but the methodology for collecting and concentrating the nanoplastics around SERS particles has not been resolved.

SUMMARY OF THE INVENTION

The present invention has been devised to solve the above problems, and an object of the present invention is to provide a method for detecting nanoplastics using a vertical nanogap electrode and a Raman spectroscopic device that can overcome diffusion limit and diffraction limit by collecting and concentrating the nanoplastics present in the water into an aggregate of micrometer size so as to enable the detection of nanoplastics through the Raman spectroscopic device.

In order to achieve the above object, a method for detecting a nanoplastic using a vertical nanogap electrode and a Raman spectroscopic device according to the present invention includes, in a state where a vertical nanogap electrode is provided in aquatic environment in which a nanoplastic exists, forming a nanoplastic aggregate having a size larger than a laser wavelength of a Raman spectroscopic device that applies an alternating voltage of a specific frequency to the vertical nanogap electrode, collects and concentrates the nanoplastic in a collector of the vertical nanogap electrode and irradiates, and performing Raman spectroscopy on the nanoplastic aggregate concentrated in the collector of the vertical nanogap electrode to detect the nanoplastic constituting the nanoplastic aggregate.

A size of the nanoplastic is smaller than a wavelength of a laser to be irradiated, and the Raman spectroscopy is performed on the nanoplastic aggregate having a size larger than the wavelength of the laser to detect a molecular type of an individual nanoplastic constituting the nanoplastic aggregate.

A size of the nanoplastic aggregate is 1 μm or more.

The alternating voltage and a frequency of the corresponding alternating voltage are controlled so that a local minimum point of potential energy acting on the vertical nanogap electrode is located in a central region of the collector of the vertical nanogap electrode.

The local minimum point of the potential energy acting on the vertical nanogap electrode due to interaction between AC-electroosmosis (ACEO) and dielectrophoresis (DEP) is located in the central region of the collector of the vertical nanogap electrode.

In the aquatic environment in which the nanoplastic exists, a minimum size of the nanoplastic is 200 nm, and a limiting of detection (LoM) of the nanoplastic is 4.66 mg/L.

A SERS particle is provided in advance in the collector of the vertical nanogap electrode, and when the alternating voltage of the specific frequency is applied to the vertical nanogap electrode, the SERS particle forms the aggregate together with the nanoplastic, the Raman spectroscopy is performed on the aggregate to detect the nanoplastic constituting the nanoplastic aggregate. In the aquatic environment in which the nanoplastic exists, a minimum size of the nanoplastic is 30 nm, and a limit of detection (LoM) of the nanoplastics is 0.01 mg/L.

The vertical nanogap electrode comprises a substrate, a first electrode stacked on an entire surface of the substrate, an insulation film and a second electrode sequentially stacked on the first electrode, the insulation film and the second electrode are removed to expose the first electrode to form the collector, and the alternating voltage of the specific frequency is applied to the first electrode and the second electrode.

The nanoplastic detection method using the vertical nanogap electrode and the Raman spectroscopic device according to the present invention has the following effects.

It is possible to detect nanoplastics present at very low concentration in the aquatic ecosystem through the Raman spectroscopic device.

The nanoplastics present in the aquatic ecosystem were difficult to be detected through the Raman spectroscopic method due to their existence at the very low concentration. However, in the present invention, the nanoplastics are collected and concentrated in the central region of the collector of the vertical nanogap electrode to achieve an appropriate balance between the actions of AC-electroosmosis (ACEO) and dielectrophoresis (DEP), so that an aggregate with a size larger than a laser wavelength of the Raman spectroscopic device, for example, the nanoplastic aggregates of micrometer size, is formed, and thus, it is possible to detect nanoplastics through the Raman spectroscopy by overcoming the diffusion limit due to the ultra-low concentration and the diffraction limit due to the nano size.

DETAILED DESCRIPTION OF THE INVENTION

Figure 1A:
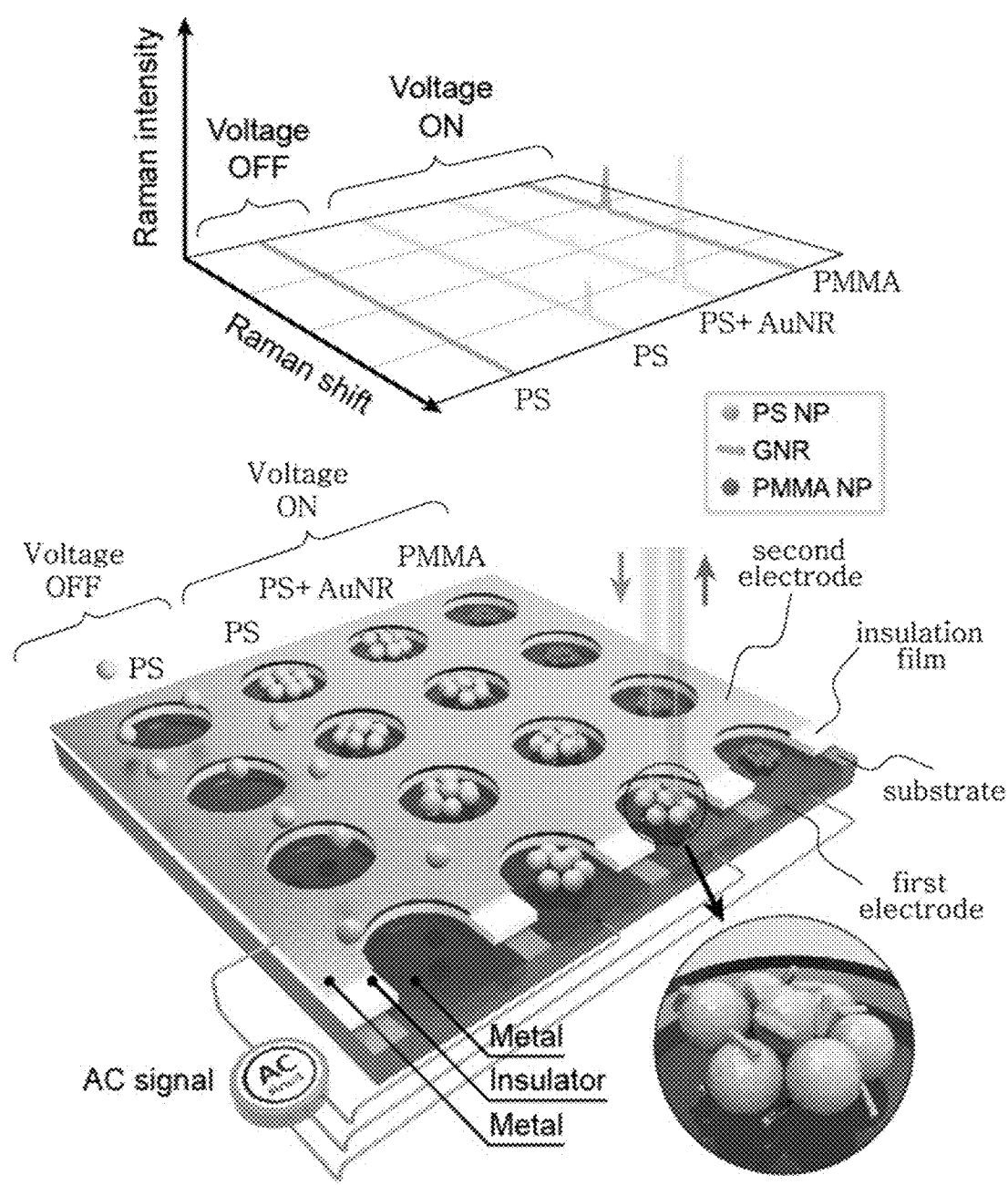
FIG. 1A is a schematic diagram of a system for implementing a method for detecting a nanoplastic using a vertical nanogap electrode and a Raman spectroscopic device according to the present invention.

The present invention proposes a technology capable of detecting nanoplastics present at ultra-low concentration in the aquatic ecosystem through a Raman spectroscopic device. It was confirmed that the nanoplastic having the size of 30 nm present at the concentration of 0.01 mg/L could be detected through experimental examples to be described later.

As previously described in the 'description of the related art', the nanoplastic refers to a plastic having the size of about 200 nm or less, and such nanoplastic is present at ultra-low concentration of, for example, about 0.02 mg/L in seawater. Because of the diffusion limit due to the ultra-low concentration and the diffraction limit due to the nano size, it is difficult to detect the nanoplastics through an analysis device, especially the Raman spectroscopic device that has the diffraction limit at the size of 500 nm or less.

The present invention collects nanoplastics and concentrates the nanoplastics into an aggregate having a size larger than the laser wavelength of the Raman spectroscopic device, for example, a nanoplastic aggregate having micrometer size, and performs Raman spectroscopy on the concentrated nanoplastic aggregate, so that a technology for capable of detecting the nanoplastics through the Raman spectroscopic device is suggested.

The present invention uses a vertical nanogap electrode to collect nanoplastics and concentrate the nanoplastics into an aggregate of micrometer size. The inventor of the present application has proposed a vertical nanogap dielectrophoretic electrode and a method for collecting and separating particles using the same in Korean Patent No. 2060099. The present invention employs the configuration of the vertical nanogap dielectrophoretic electrode disclosed in Korean Patent No. 2060099 as the vertical nanogap electrode of the present invention.

Korea Patent No. 2060099 discloses applying an electric field to a vertical nanogap dielectrophoretic electrode having a predetermined geometric shape, and collecting polystyrene (PS) particles with the size of 1 μm on the vertical nanogap dielectrophoretic electrode due to dielectrophoresis (DEP). FIGS. 7 and 8 of Korean Patent No. 2060099 show that the polystyrene (PS) particles are collected by dielectrophoresis (DEP) in a form arranged along the hole edge of the vertical nanogap dielectrophoretic electrode.

The dielectrophoresis (DEP) is a method in which a particle has an induced dipole in a non-uniform electric field and the resulting force is used to move the particle. Korean Patent No. 2060099 discloses a method in which the polystyrene (PS) particle is moved to the hole edge of the vertical nanogap dielectrophoretic electrode with a strong electric field.

Meanwhile, when an electric field is applied to a fluid containing particles, the force acting on the particles and the fluid can be generally divided into the dielectrophoresis (DEP) and the AC-electroosmosis (ACEO). In the dielectrophoresis (DEP), the particles are moved by an electric field as mentioned above, and the AC-electroosmosis (ACEO) refers to a phenomenon in which a fluid is moved by an electric field.

The dielectrophoresis (DEP) and the AC-electroosmosis (ACEO) are generated within an electric field to which an alternating voltage of a specific frequency is applied. It is known that the AC-electroosmosis (ACEO) is generated at a relatively low frequency, and the dielectrophoresis (DEP) is generated at a relatively high frequency.

The present invention collects and concentrates the nanoplastics in the center of the hole of the vertical nanogap electrode by applying an alternating voltage of a specific frequency that achieves an appropriate balance between the dielectrophoresis (DEP) and the AC-electroosmosis (ACEO) to form an aggregate of micrometer size. In such a situation, it is possible to (detect the nanoplastics by irradiating the laser of a Raman spectroscopic device on the aggregate of micrometer size.

Korean Patent No. 2060099 proposes a configuration in which polystyrene (PS) particles with the size of 1 μm are collected on the edge of a hole through the dielectrophoresis (DEP), and a configuration in which the collected polystyrene (PS) particles are dispersed by applying a high frequency (1 MHz, 10 MHz) (see FIG. 7). However, these configurations are clearly different from collecting and concentrating the nanoplastics into an aggregate of micrometer size, and furthermore, have nothing to do with the technology that detects the nanoplastics through Raman spectroscopy on the collected and concentrated nanoplastic aggregate.

The reason for describing the similarities and differences between the present invention and the contents described in Korean Patent No. 2060099 is to emphasize that, although the present invention is similar in configuration to Korean Patent No. 2060099 in that it employs the vertical nanogap electrode and induces movement of particles by applying an alternating electric field, the configuration of collecting and concentrating the nanoplastics present at ultra-low concentration into an aggregate of micrometer size, and the configuration of detecting the nanoplastics through Raman spectroscopy on the nanoplastic aggregate cannot be achieved by Korean Patent No. 2060099. In particular, the present invention is an advanced invention compared to Korean Patent No. 2060099 in that it proposes a configuration for detecting the nanoplastics present at the ultra-low concentration by overcoming the diffusion limit due to the ultra-low concentration and the diffraction limit due to the nano size.

For reference, the inventor of the present application has proposed a terahertz sensing system capable of detecting a particle of nano size in Korean Patent No. 2254587. However, this patent has a fundamental difference from the present invention in whether or not Raman spectroscopy is employed, and it is not related to the configuration of the present invention in that the microplastics of micrometer size cannot be detected in this patent. Hereinafter, a method for detecting a nanoplastic using a vertical nanogap electrode and a Raman spectroscopic device according to an embodiment of the present invention will be described in detail with reference to the drawings.

Referring to FIG. 1, a system for implementing a nanoplastic detection method using the vertical nanogap electrode and the Raman spectroscopic device according to an embodiment of the present invention includes a nanoplastic concentrating device including the vertical nanogap electrode, and the Raman spectroscopic device that detects the nanoplastics by performing Raman spectroscopy on the nanoplastic aggregate collected and concentrated on the vertical nanogap electrode.

As mentioned above, the vertical nanogap electrode of the present invention adopts the configuration of the vertical nanogap dielectrophoretic electrode disclosed in Korean Patent No. 2060099, and the configuration is summarized as follows.

The vertical nanogap electrode according to an embodiment of the present invention includes a substrate, a first electrode stacked to a predetermined thickness over the entire surface of the substrate, an insulation film stacked on the first electrode, and a second electrode stacked on the insulation film. In the stacked structure of the insulation film and the second electrode, a collector exposing the first electrode is provided, and the insulation film and the second electrode are removed in the region where the collector is provided. Accordingly, in the region where the collector is provided, the bottom surface of the collector corresponds to the first electrode, and the insulation film and the second electrode are stacked around the collector. Such collectors may be repeatedly disposed spaced apart from the substrate plane.

The space of the collector corresponds to a region where the nanoplastics are collected and concentrated to form an aggregate, and more precisely, the formation of the nanoplastic aggregate is induced in the central region of the collector. In addition, the central region of the collector corresponds to the region to which the laser of the Raman spectroscopic device is irradiated. Accordingly, by irradiating a laser to the nanoplastic aggregate in a state in which the formation of the nanoplastic aggregate is induced in the central region of the collector, the nanoplastic constituting the nanoplastic aggregate can be detected through Raman spectroscopy. Here, the collector is divided into a central area and a peripheral area on a planar basis, the peripheral area refers to an area adjacent to the circumference of the collector, and the central area refers to an area within a certain radius from the center of the collector.

In the experimental examples to be described later, ITO as the first electrode and Au as the second electrode were each stacked to a thickness of 40 nm on the insulation substrate, and polyvinylpyrrolidone (PVP) was stacked to a thickness of 100 nm as the insulation film between the ITO and the Au, and the collector was designed with a diameter of 10 μm.

For the detection of nanoplastics, the vertical nanogap electrode is immersed in an environment in which the nanoplastics exist, for example, the aquatic ecosystem or a sample collected from the aquatic ecosystem.

An electric field control device is provided on one side of the vertical nanogap electrode.

The electric field control device is a device that applies an AC voltage of a predetermined frequency to the first and second electrodes of the vertical nanogap electrode. When the alternating voltage of a certain frequency is applied to the first and second electrodes of the vertical nanogap electrode in a state where the vertical nanogap electrode is immersed in an environment in which the nanoplastics are present, the nanoplastics are collected and concentrated in the central region of the collector of the vertical nanogap electrode to form the aggregate of micrometer size due to the dielectrophoresis (DEP) and the AC-electroosmosis (ACEO).

When the AC voltage of a predetermined frequency is applied to the first electrode and the second electrode of the vertical nanogap electrode, the collection and concentration of the nanoplastics is affected by the AC voltage and the frequency of the AC voltage. That is, the dielectrophoresis (DEP) and the AC-electroosmosis (ACEO) are changed according to the AC voltage and the frequency of the AC voltage applied to the first electrode and the second electrode, thereby affecting the collection and concentration of the nanoplastics.

As a result of applying different voltages and frequencies to the vertical nanogap electrode having a material composition and a geometric shape as described in an experimental examples to be described later, it was confirmed that the nanoparticles with the size of 200 nm present at the ultra-low concentration of 4.66 mg/L could be concentrated to enable the Raman spectroscopy under the conditions of the alternating voltage of 3 V and the frequency of 10 kHz. In addition, in the test result of the surface-enhanced Raman spectroscopy (SERS) in which the collection and concentration of nanoplastics were carried out in the state where a gold nanorod was provided in the collector of the vertical nanogap electrode showed that the nanoparticles with the size of 30 nm present at the ultra-law concentration of 0.01 mg/L was obtained under the condition of the alternating voltage of 5V and the frequency of 10 kHz.

The actions of dielectrophoresis (DEP) and AC-electroosmosis (ACEO) are particularly affected by the frequency. As mentioned above, it is known that the AC-electroosmosis (ACEO) is generated at a relatively low frequency, and the dielectrophoresis (DEP) is generated at a relatively high frequency.

In this experiment, the frequencies of 1 kHz, 10 kHz, 100 kHz, and 1 MHz were applied under the condition of the alternating voltage of 2 V, respectively. At the frequency of 1 kHz, the AC-electroosmosis (ACEO) was dominant, and only the flow of fluid occurred, so the nanoplastic concentration effect was insignificant. At the frequency of 10 kHz, the particle movement by the dielectrophoresis (DEP) was induced in the process of fluid flow, and the nanoplastics were concentrated in the form of aggregate in the central region of the collector of the vertical nanogap electrode. At the frequency of 100 kHz, the dielectrophoresis (DEP) was dominant, and as a result, the nanoplastics was moved to the surrounding area of the collector. At the frequency of 1 MHz, negative dielectrophoresis (DEP) caused the nanoplastic particles to be pushed out of the collector.

Through these results, it can be seen that the nanoplastics can be concentrated in the form of aggregate for enabling Raman spectroscopy so that the dielectrophoresis (DEP) and the AC-electroosmosis (ACEO) are properly balanced through the optimal control of frequency and AC voltage.

However, the optimal frequency and AC voltage for concentrating the nanoplastic into the form of aggregate to enable Raman spectroscopy may be affected by the materials constituting the vertical nanogap electrode and the geometric shape of the vertical nanogap electrode, and thus, the numerical values for the optimal frequency and AC voltage are not limited to the numerical values described above.

In other words, it was demonstrated that by applying the alternating voltage having a specific frequency to the vertical nanogap electrode, the nanoplastics could be concentrated in the form of an aggregate to enable Raman spectroscopy through an appropriate balance of the dielectrophoresis (DEP) and the AC-electroosmosis (ACEO). Thus, it should be emphasized as a remarkable improvement compared to the prior art that the nanoplastics can be concentrated in the form of an aggregate to enable Raman spectroscopy by applying the alternating voltage of a specific frequency to the vertical nanogap electrode. The frequency value and AC voltage value at this time can be said to be incidental features.

On the other hand, in concentrating the nanoplastic by applying the alternating voltage of a specific frequency to the vertical nanogap electrode, SERS particles such as gold nanoparticles or silver nanoparticles can also be provided in the collector of the vertical nanogap electrode for the surface-enhanced Raman scattering (SERS). The SERS particles are combined with the nanoplastic particles to form an aggregate, and play a role in amplifying the Raman signal. Through this effect, it is possible to detect the nanoplastics present at a lower concentration and having a smaller size. In the experimental examples to be described later, the nanoplastics having the size of 30 nm were detected at the ultra-low concentration of 0.01 mg/L through the SERS.

As described above, the method for detecting nanoplastics using the vertical nanogap electrode and the Raman spectroscopic device according to an embodiment of the present invention has been described. Hereinafter, the present invention will be described in more detail through experimental examples.

Experimental Example 1: Manufacturing of a Vertical Nanogap Electrode

After sequentially stacking 40 nm of ITO, 100 nm of PVP, and 40 nm of Au on an insulation substrate, the Au and the PVP were removed to expose the ITO through photolithography and etching processes to form a collector with a diameter of 10 μm to complete a vertical nanogap electrode.

Experimental Example 2: Collection of Nanoplastics

The vertical nanogap electrode manufactured in Experimental Example 1 was immersed in a fluid in which polystyrene (PS) having the size of 200 nm was present at the concentration of 10 mg/L, and an experiment in which the AC voltage of 2V having the frequency of 10 kHz was selectively applied the ITO (first electrode) and Au (second electrode) of the vertical nanogap electrode was conducted.

Figure 1B:
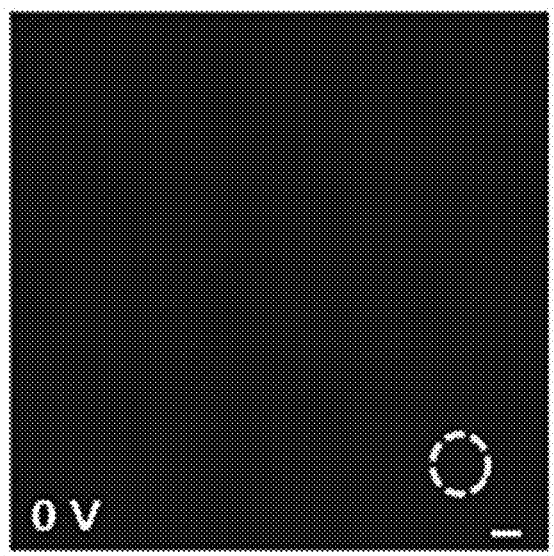
FIG. 1B to 1G are fluorescence microscope and SEM images showing the state of collecting nanoplastics according to whether or not an AC voltage is applied.
Figure 1C:
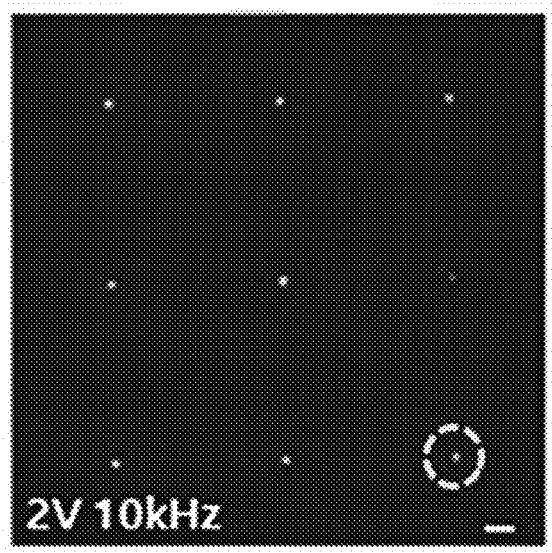
Figure 1D:
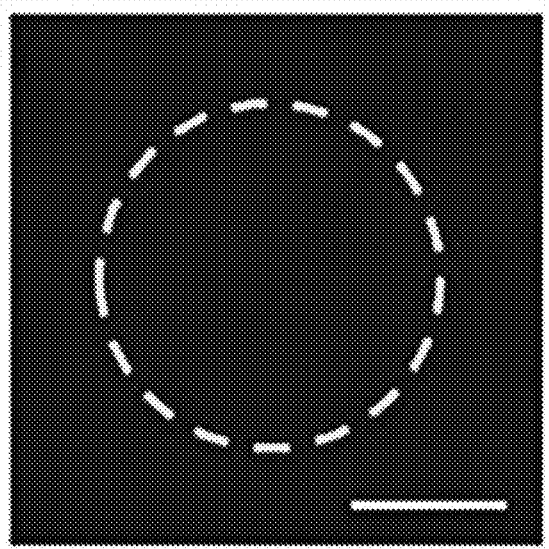
Figure 1E:
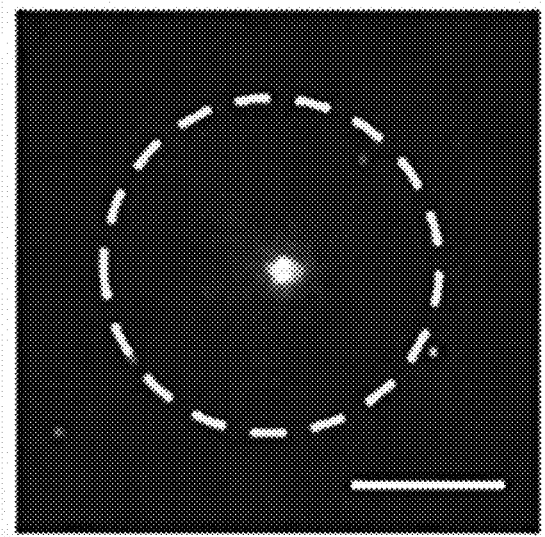
Figure 1F:
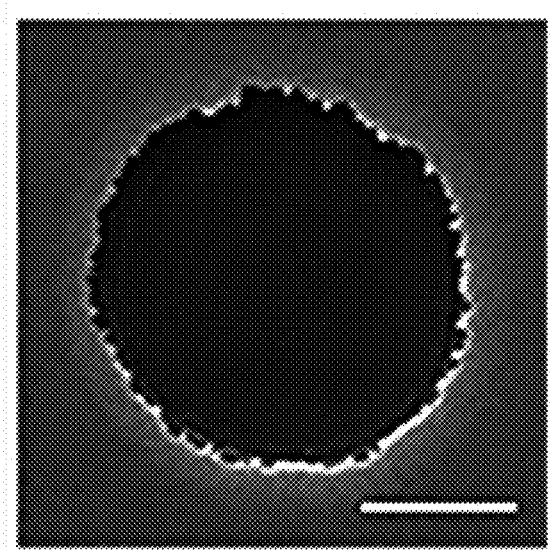
Figure 1G:
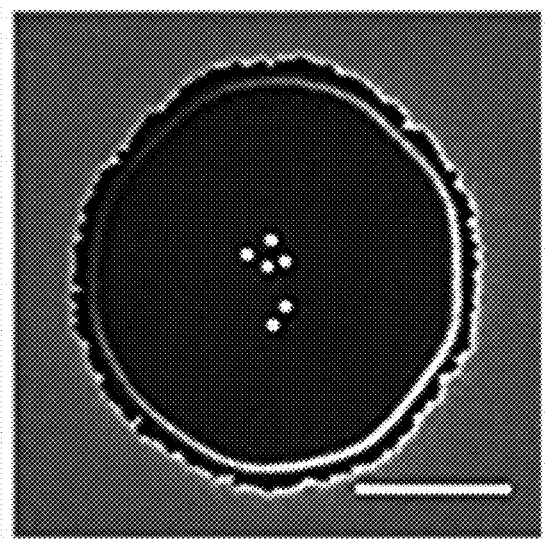

FIGS. 1B, 1D and 1F show the fluorescence microscope and SEM images of the vertical nanogap electrode when no AC voltage is applied. FIGS. 1C, 1E and 1G show the fluorescence microscope and SEM images of the vertical nanogap electrode when the AC voltage is applied. Through FIG. 1B to 1G, it can be confirmed that when the AC voltage of 2V with the frequency of 10 kHz is applied, polystyrene (PS) is collected and concentrated in the collector of the vertical nanogap electrode.

Figure 2A:
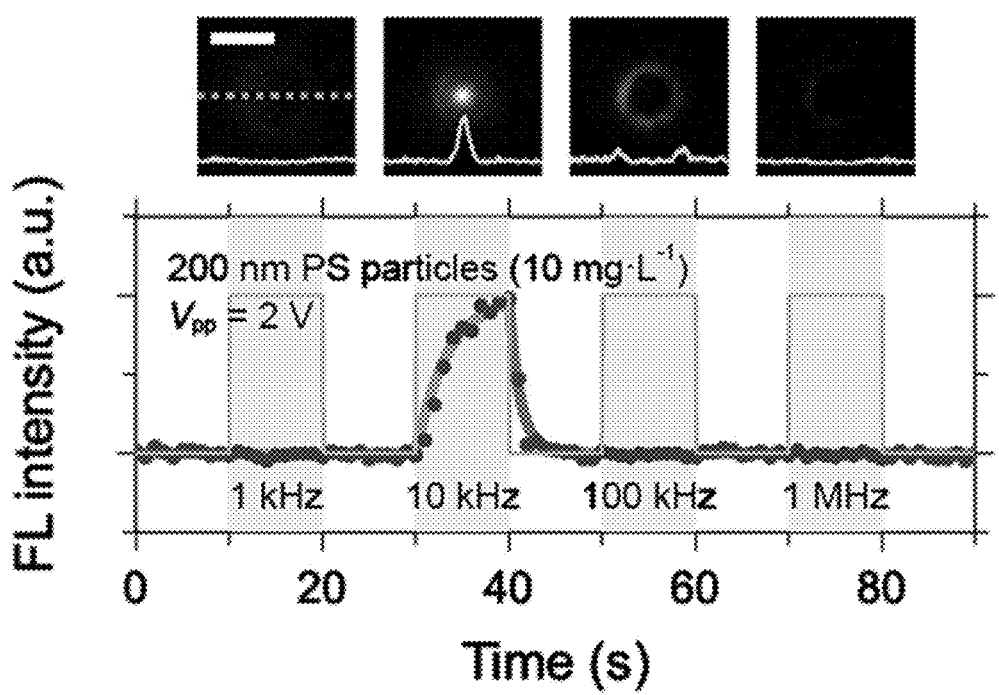
FIG. 2A shows an experimental result showing the collection and concentration characteristics of fluorescent polystyrene (PS) particles according to a frequency.
Figure 2B:
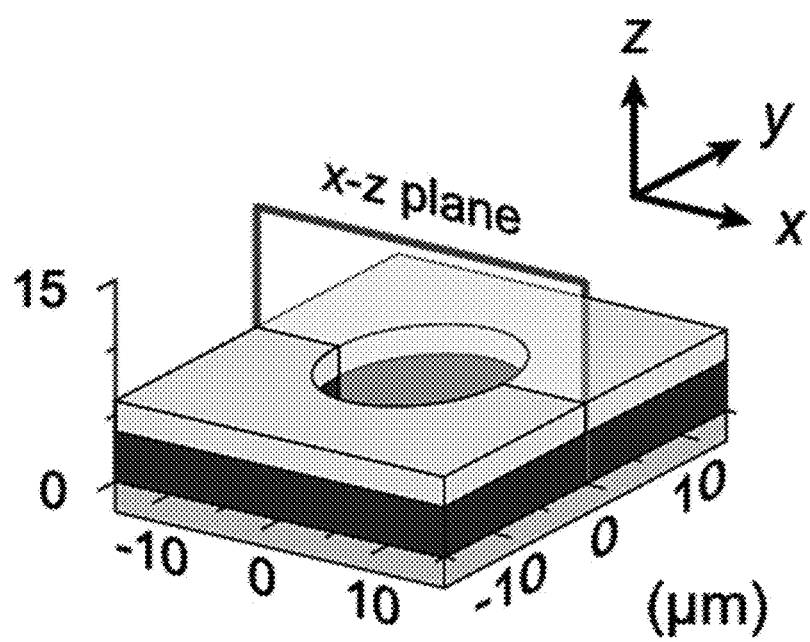
FIG. 2B is a conceptual diagram of a vertical nanogap electrode.

Experimental Example 3: Optimal Frequency and Voltage for Nanoplastic Concentration In a state where the AC voltage was fixed at 2V, the frequency of the AC voltage was changed to 1 kHz, 10 kHz, 100 kHz, and 1 MHz to conduct a nanoplastic enrichment experiment. As a result of the experiment, as shown in FIG. 2A, under the 10 kHz condition, the nanoplastics were concentrated in the central region of the collector of the vertical nanogap electrode to form an aggregate, whereas under the 100 kHz condition, the nanoplastics were arranged along the peripheral area of the collector.

Figure 2C:
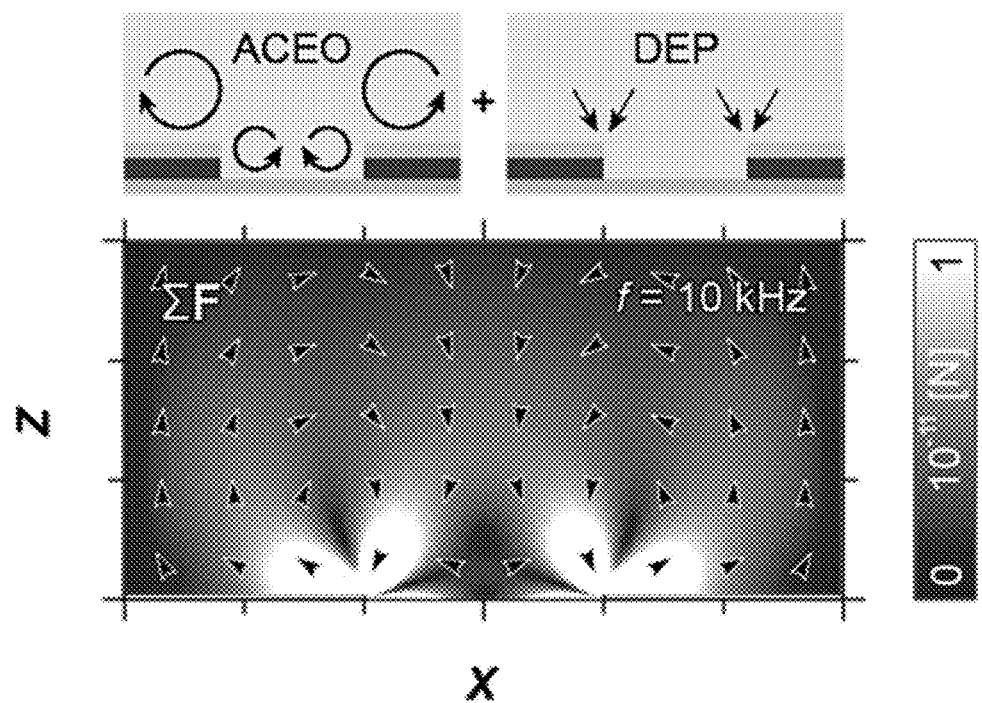
FIG. 2C is a force energy distribution diagram showing the direction and distribution of a force generated by AC-electroosmosis (ACEO) and dielectrophoresis (DEP) when an AC voltage is applied.

The theoretical interpretation of these results based on the simulation values is as follows. As shown in FIG. 2C, the electric double layer (EDL) concentrated on the electrode surface by the application of AC voltage generates a fluid flow from the peripheral region of the collector to the outside of the collector by the AC-electroosmosis (ACEO), and the particles move to the surrounding area of the collector by the dielectrophoresis (DEP). Therefore, the movement and concentration of particles to the central region of the collector is determined by controlling the balance of the AC-electroosmosis (ACEO) and the dielectrophoresis (DEP).

Figure 2D:
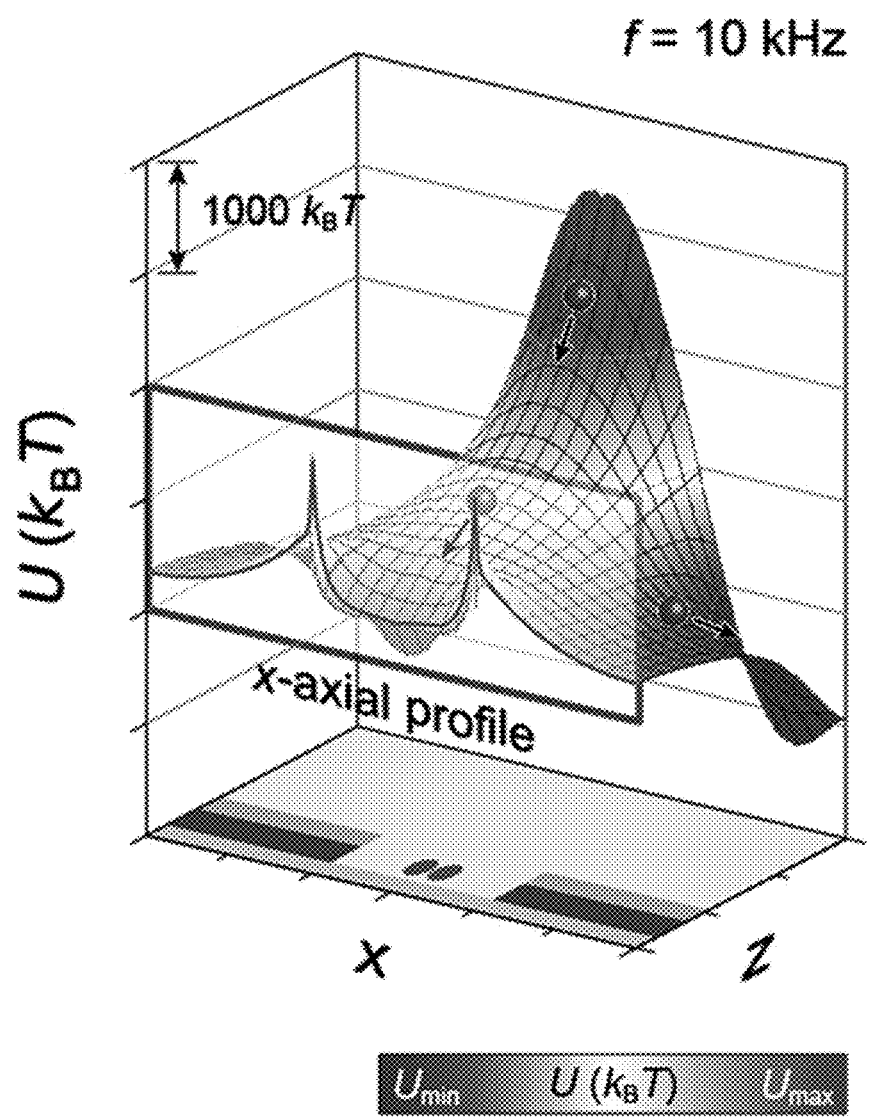
FIG. 2D is a simulation result for potential energy in a vertical nanogap electrode.

Considering that the particles move to a lower energy state and are going to be located at the local minimum point of potential energy, the simulation result (10 kHz, 2V) for the potential energy acting on the vertical nanogap electrode shown in FIG. 2D can be analyzed intuitively on the particle position. Referring to FIG. 2D, it can be seen that the local minimum point of potential energy exists in the central region of the collector and outside the collector, which means that the particles are collected in the central region of the collector by the surface slip flow or are discharged to the outside the collector by the circulation flow. In addition, this simulation result shows that the AC-electroosmosis (ACEO) dominates over the dielectric flow (DEP) under the condition of 10 kHz frequency, and the collection and concentration are formed in the central region of the collector by the simultaneous interaction of the AC-electroosmosis (ACEO) and the dielectric flow (DEP). On the other hand, under the condition of the 100 kHz frequency, the dielectrophoresis (DEP) has a dominant influence on the particle position.

Figure 2E:
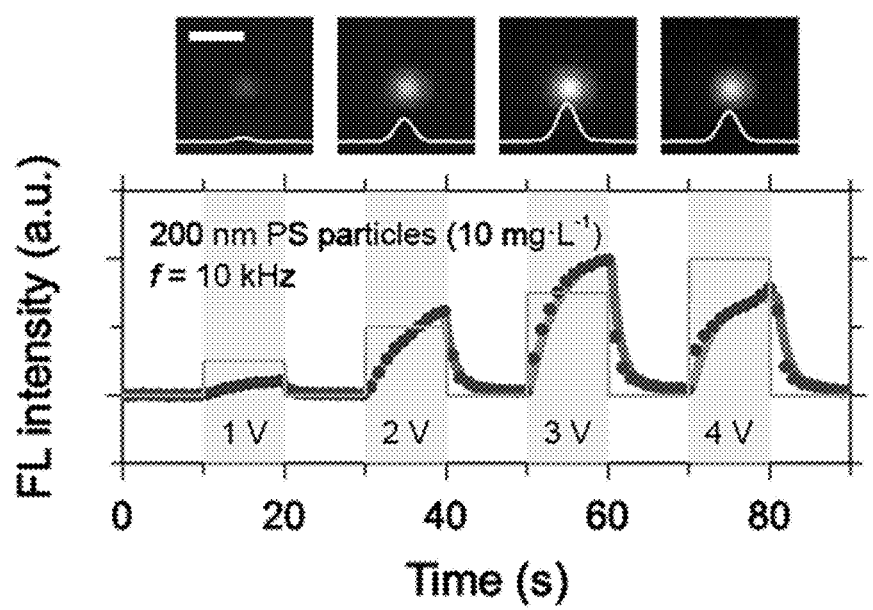
FIG. 2E shows an experimental result showing the collection and concentration characteristics of fluorescent polystyrene (PS) particles according to the magnitude of an AC voltage.
Figure 2F:
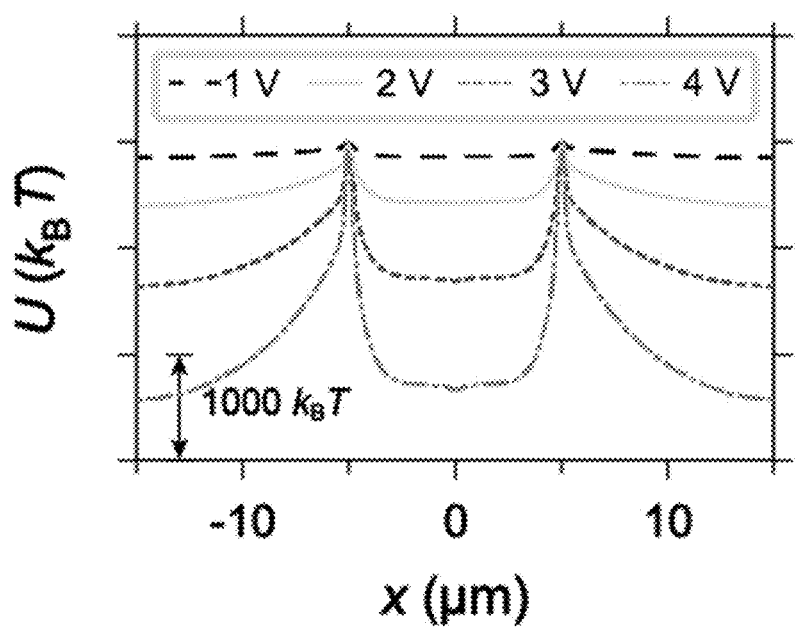
FIG. 2F shows an energy curve according to the magnitude of an AC voltage.
Figure 2G:
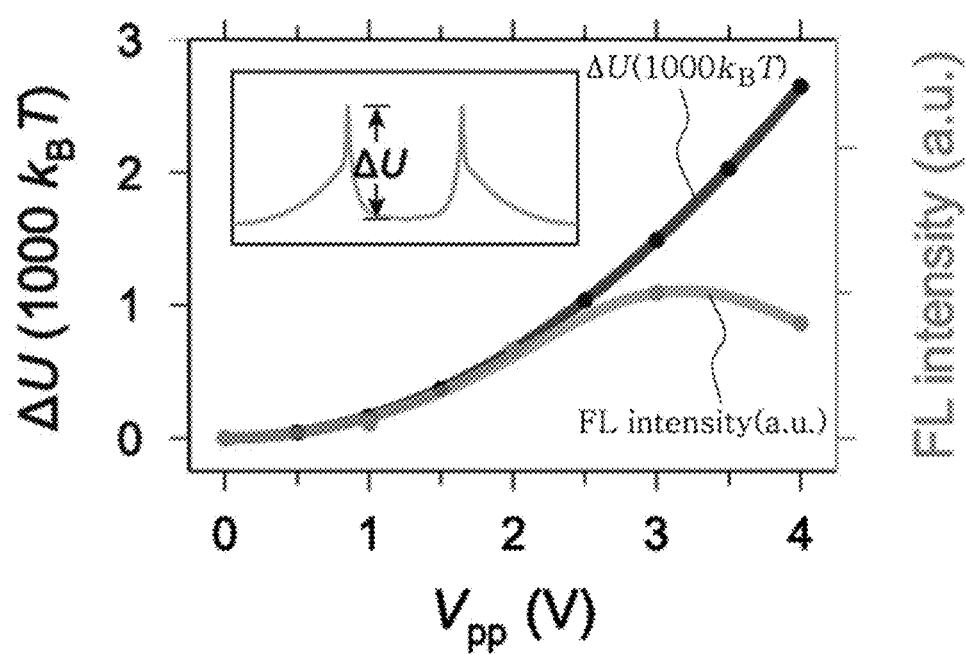
FIG. 2G is graph showing the comparisons of the distribution of energy values (red curve) on the cross-section of a vertical nanogap electrode and the intensity of the collected fluorescent particles (blue curve) according to the magnitude of an AC voltage.

Experimental results in which the frequency was fixed at 10 kHz and the AC voltage was applied differently as 1V, 2V, 3V, and 4V, respectively, are as shown in FIG. 2E to 2G. When the magnitude of the AC voltage increased to 3V, the concentration of the nanoplastics toward the central region of the collector was strengthened, but when the AC voltage of 4V was applied, the concentration was reduced compared to the AC voltage of 3V (FIG. 2E). The potential energy profile on the surface of the vertical nanogap electrode (see FIG. 2F) indicates that the potential energy of the central region of the collector decreases as the voltage increases.

Referring to FIG. 2G, the potential depth (AU) of the potential energy profile was found to be about 102 to 103 $k_BT$, and in general, the potential depth of 10 $k_BT$ or more ensures stable trapping by the thermal energy of particles. This result means that the particles are stably concentrated in the central region of the collector. The calculated AU increases proportionally to the square of the amplitude of the applied voltage ($\Delta U \propto V_{pp}^2$, red line in FIG. 2G), while the experimental maximum FL intensity (see FIG. 2E) shows similar behavior up to the voltage of 3 V and discrepancy above the voltage of 3 V. (blue line in FIG. 2G). The discrepancy and contradictory particle dynamics between the simulations and the experiments above the voltage of 3 V are considered to be caused by saturation of the allowable number of particles in a limited region and Faraday electrode reactions at the voltage above 3 V.

Experimental Example 4: Characteristic of Limit of Detection

Through Experimental Example 3, it was confirmed that nanoplastics could be concentrated in the form of aggregate having micrometer size, and the Raman spectroscopy analysis was conducted for this, and the limit of detection of nanoplastics was examined.

Figure 3A:
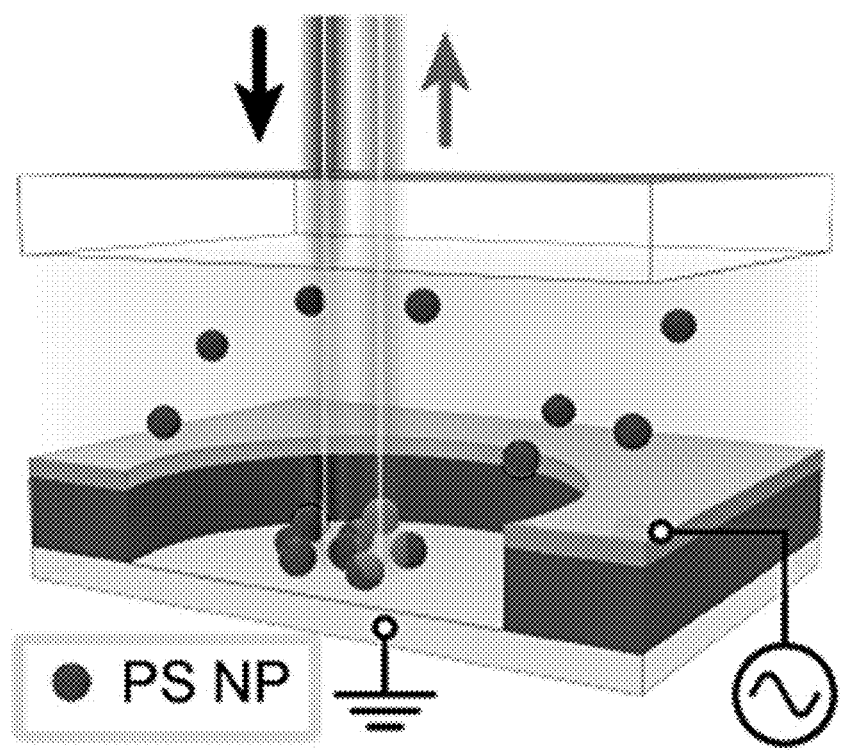
FIG. 3A is a schematic diagram for the collection and detection of nanoplastics.
Figure 3B:
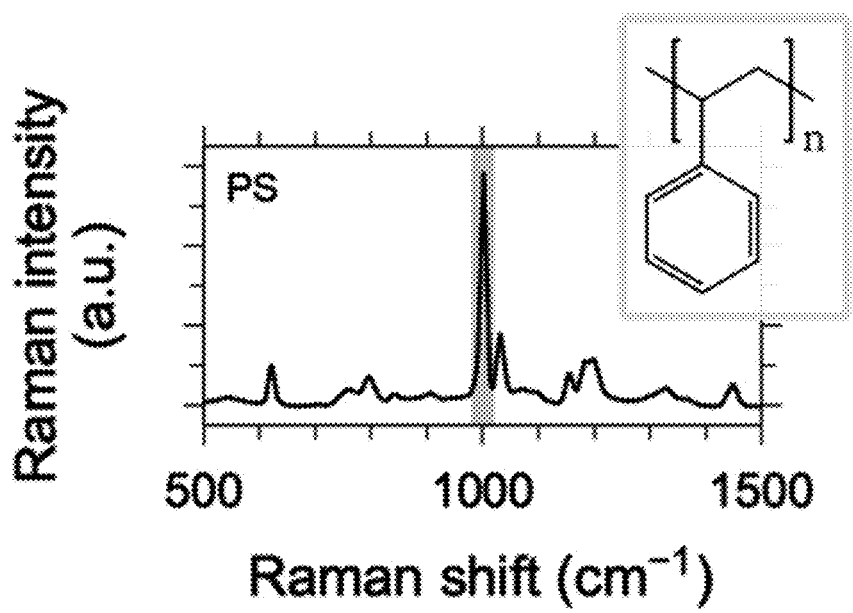
FIG. 3B is a Raman spectroscopy result of polystyrene (PS) according to Experimental Example 4.
Figure 3C:
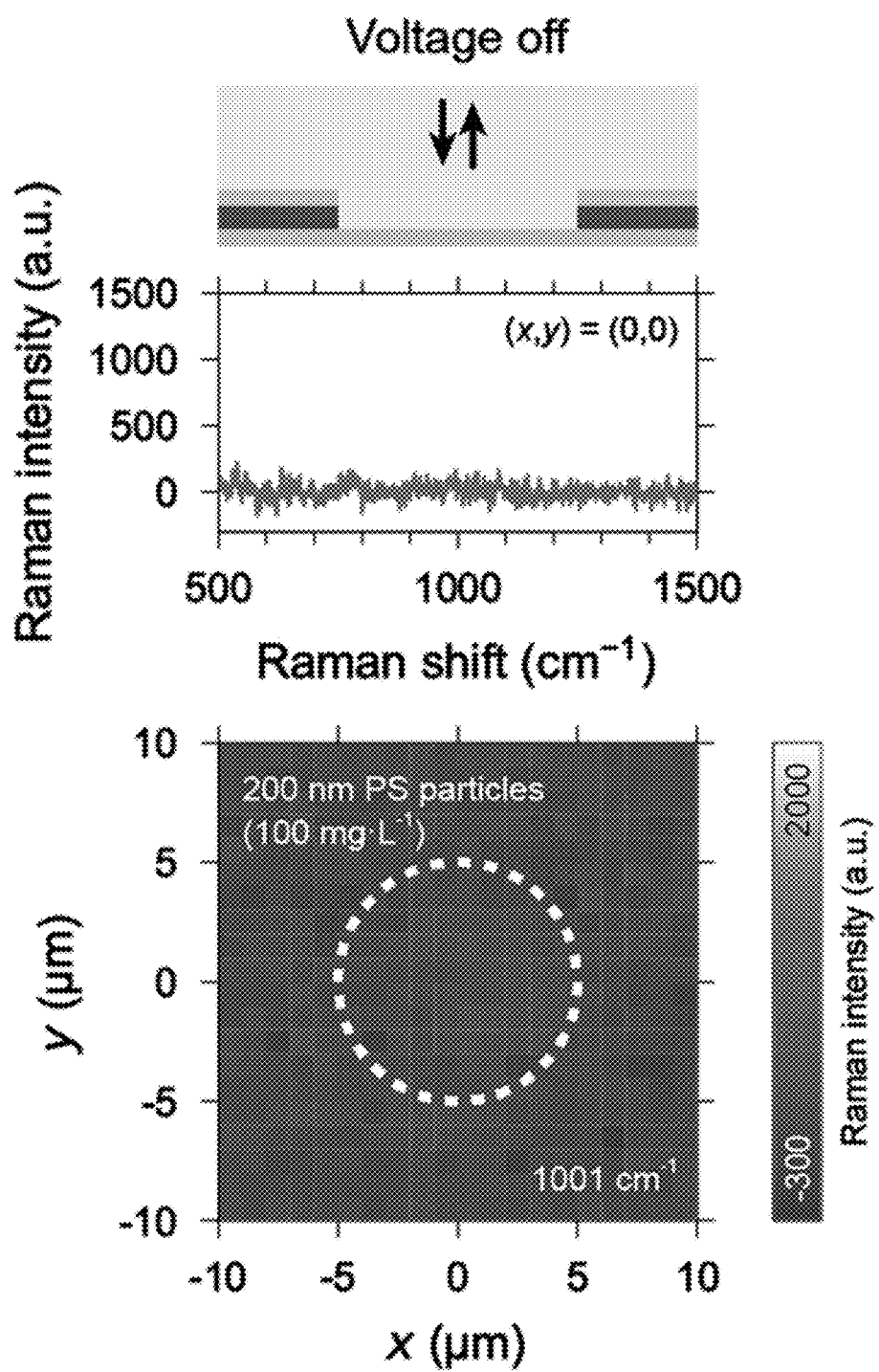
FIGS. 3C and 3D show the detection state of Raman spectrum according to whether an AC voltage is applied, respectively.
Figure 3D:
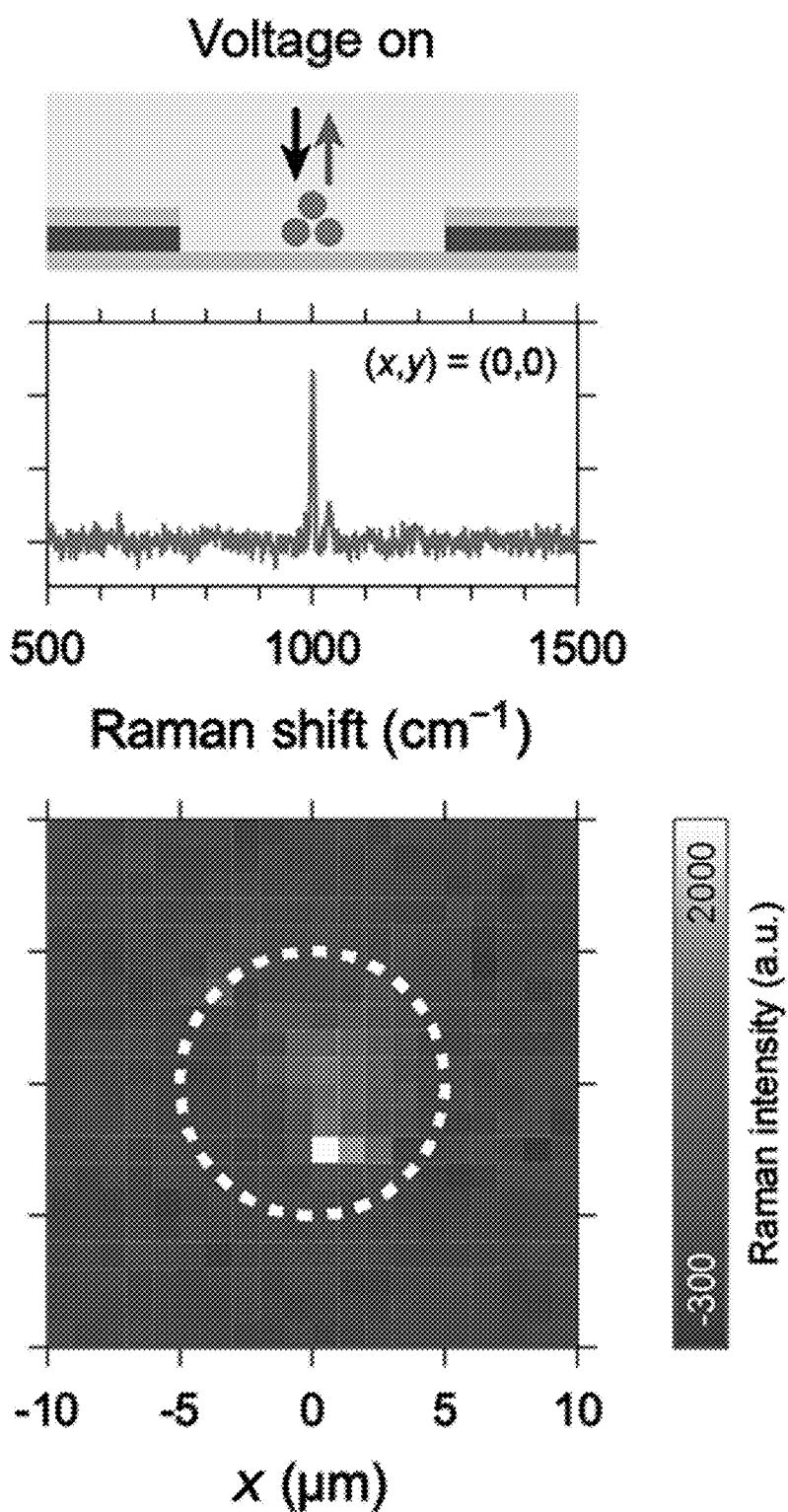

The Raman spectroscopy was performed by applying the AC voltage of 2V with the frequency of 10 kHz to the vertical nanogap electrode, so that the polystyrene (PS) of 200 nm with the concentration of 100 mg/L was concentrated in the collector, and then by irradiating the laser (50 W) with the wavelength of 532 nm with the width of 2 μm, and the Raman spectrum of polystyrene (PS) was confirmed (see FIG. 3B). FIGS. 3C and 3D respectively show the Raman spectrum detection according to whether or not the AC voltage is applied. When no voltage was applied, no Raman spectrum was detected, which meant that polystyrene (PS) was not concentrated in the collector.

Figure 3E:
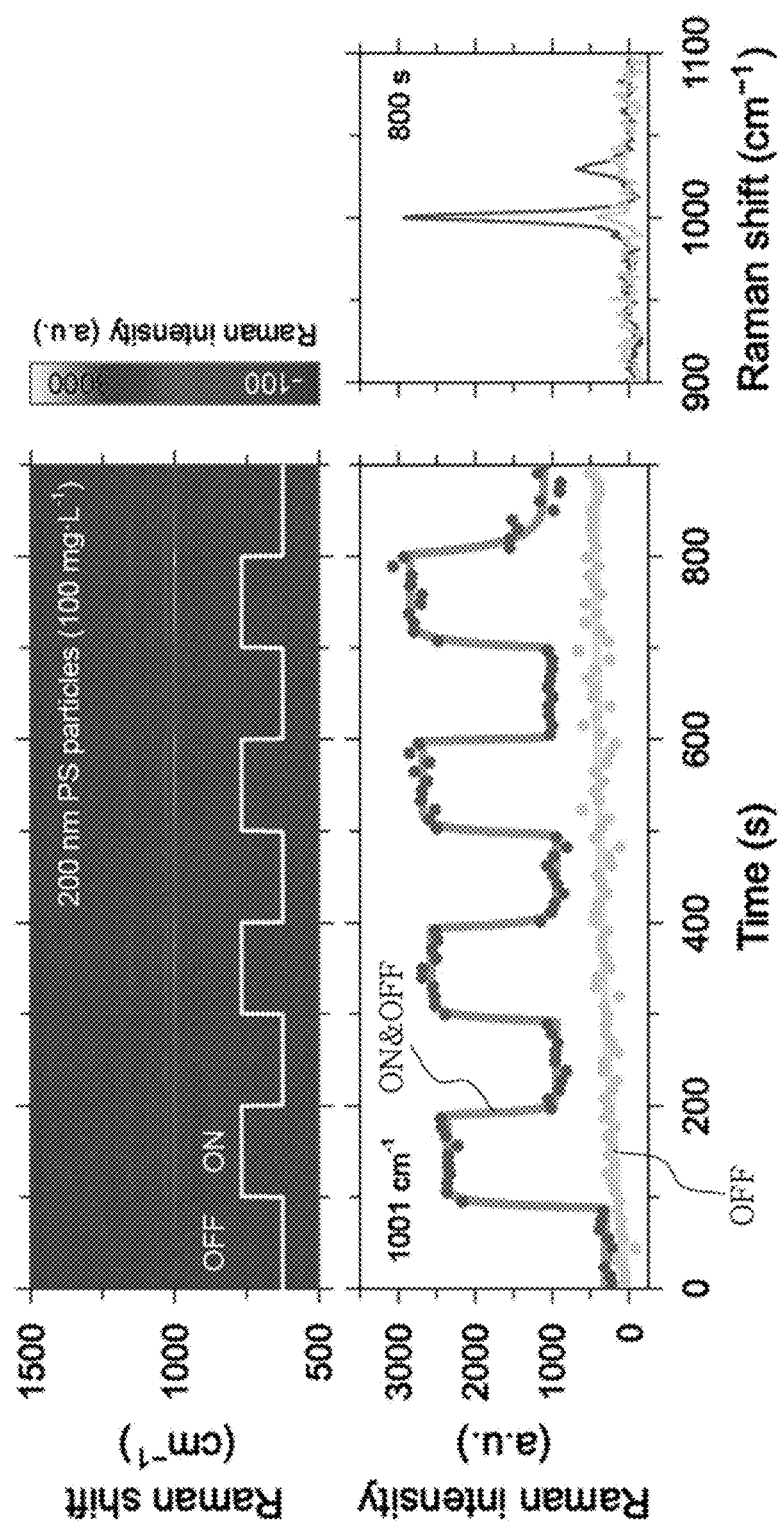
FIG. 3E shows a Raman signal intensity according to the on/off of an AC voltage.

In addition, as a result of repeatedly performing alternating on/off of the AC voltage at intervals of 100 seconds, the intensity of the Raman signal was insignificant when the AC voltage was off, whereas the Raman signal for polystyrene (PS) was clearly detected when the AC voltage was on (see blue in FIG. 3E). Through this, it can be seen that the concentration and dispersion of polystyrene (PS) are possible according to the on/off of the AC voltage. In addition, as a result of performing the Raman spectroscopy without applying the AC voltage for comparison (see orange in FIG. 3E), it was confirmed that the Raman signal for polystyrene (PS) was insignificant over the entire section.

Figure 3F:
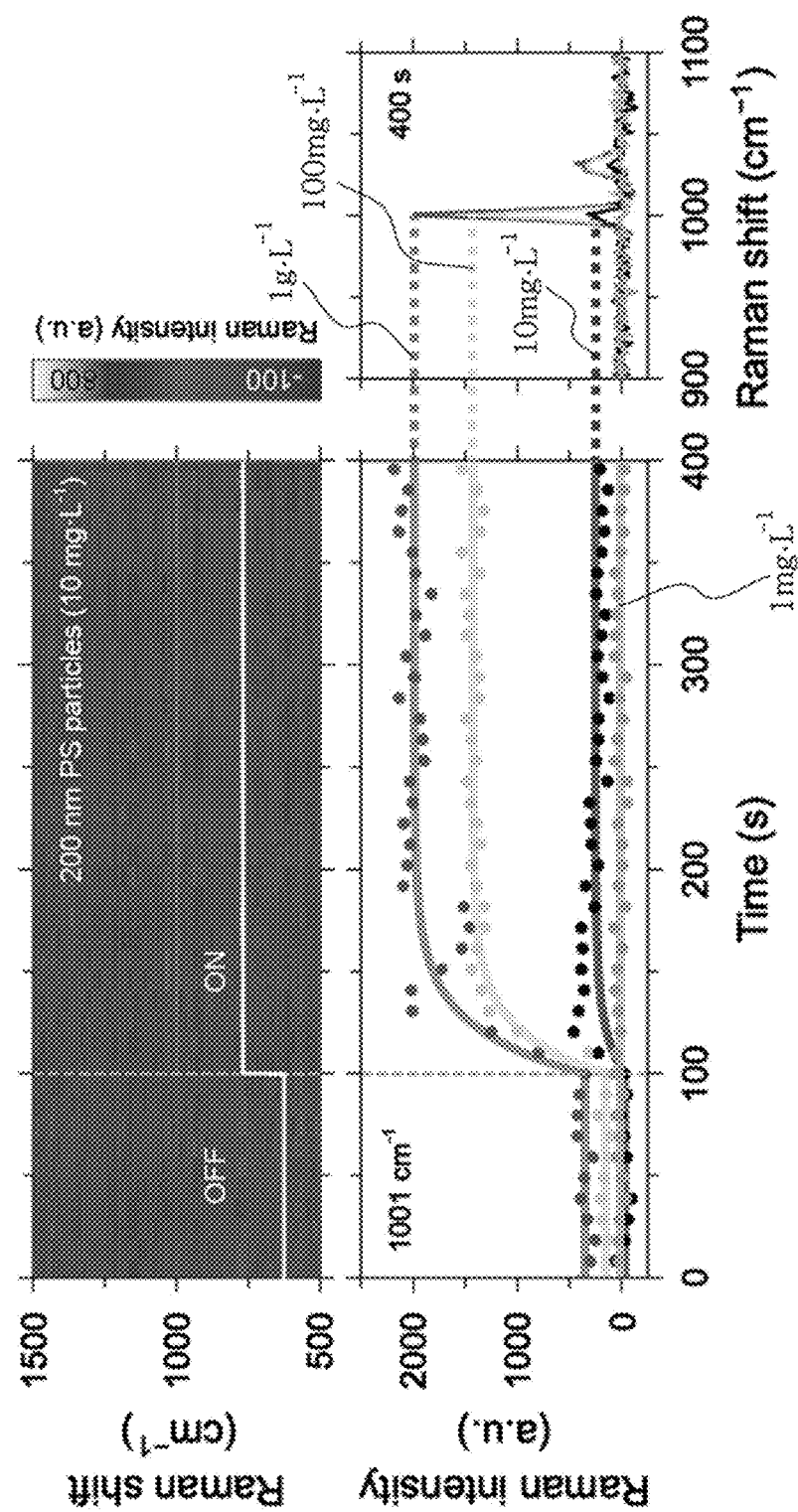
FIG. 3F shows a Raman signal intensity according to polystyrene (PS) concentration.

In order to confirm the lowest concentration of nanoplastics detectable through the Raman spectroscopy, that is, the limit of detection, the concentration of polystyrene (PS) of 200 nm was set at 1000 mg/L, 100 mg/L, 10 mg/L, and 1 mg/L, respectively, and the Raman spectroscopy was performed on them (10 kHz, AC voltage of 2V). As a result of the experiment, as shown in FIG. 3F, the particle size of the maximum Raman signal was reduced in a saturation region, and the detected intensity of the Raman signal was converted into a function of particle concentration and calculated through the Langmuir adsorption model. Accordingly, the lowest concentration for detecting polystyrene (PS) having the size of 200 nm, that is, the limit of detection, was evaluated to be 4.66 mg/L.

Experimental Example 5: Detection of Nanoplastics by Surface-Enhanced Raman Spectroscopy (SERS)

The surface-enhanced Raman spectroscopy (SERS) was performed to examine the possibility of improving the limit of detection (LoM).

Figure 4A:
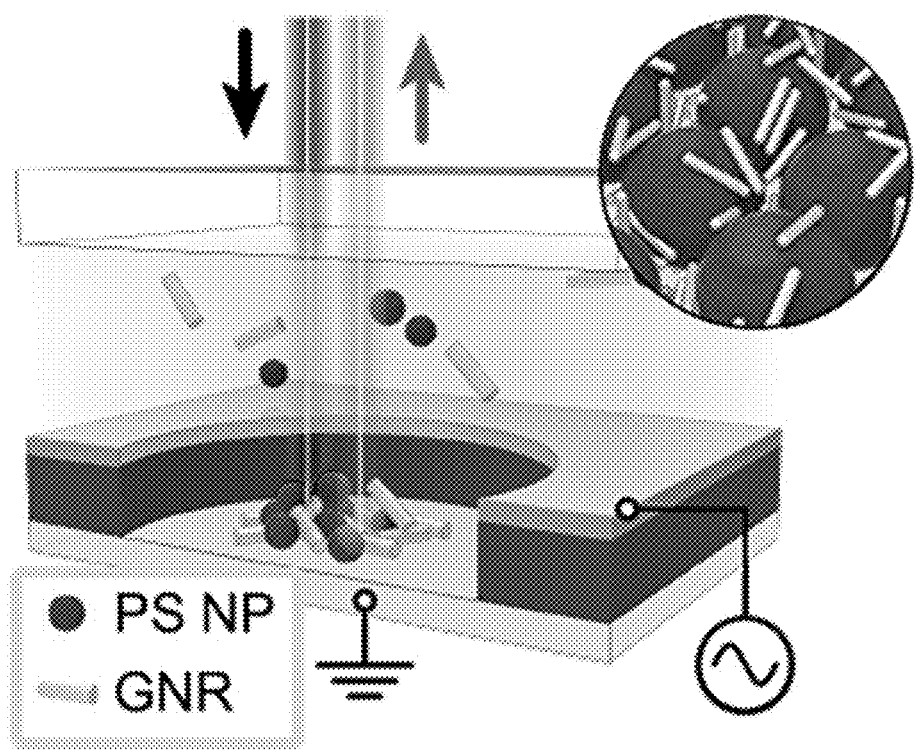
FIG. 4A is a schematic diagram for surface-enhanced Raman spectroscopy (SERS) of the present invention.
Figure 4B:
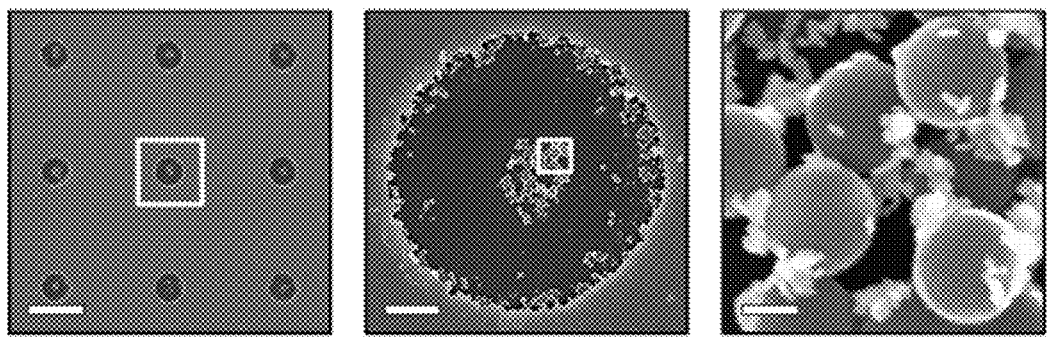
FIG. 4B is a SEM image showing that gold nanorod (GNR) and polystyrene (PS) are collected and concentrated in a collector of a vertical nanogap electrode.
Figure 4C:
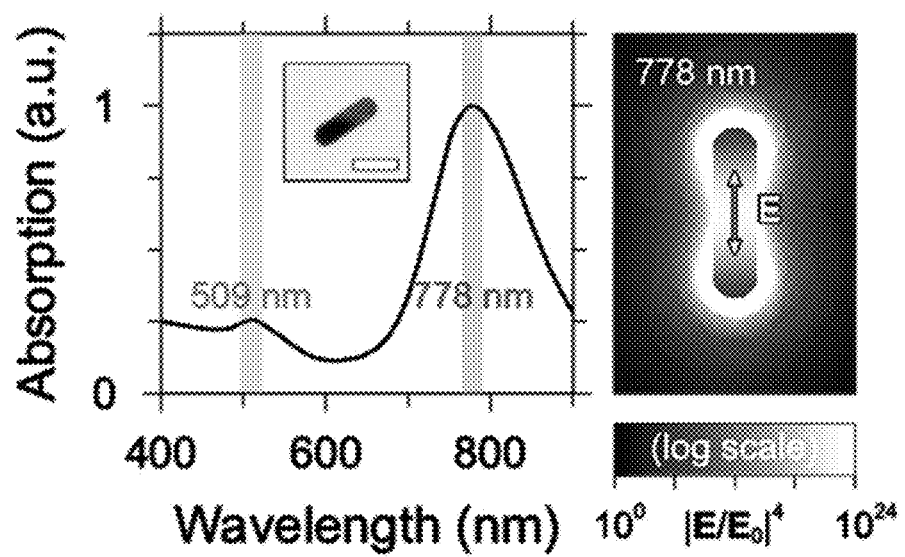
FIG. 4C shows an absorption spectrum of each laser wavelength of a gold nanorod (GNR).
Figure 4D:
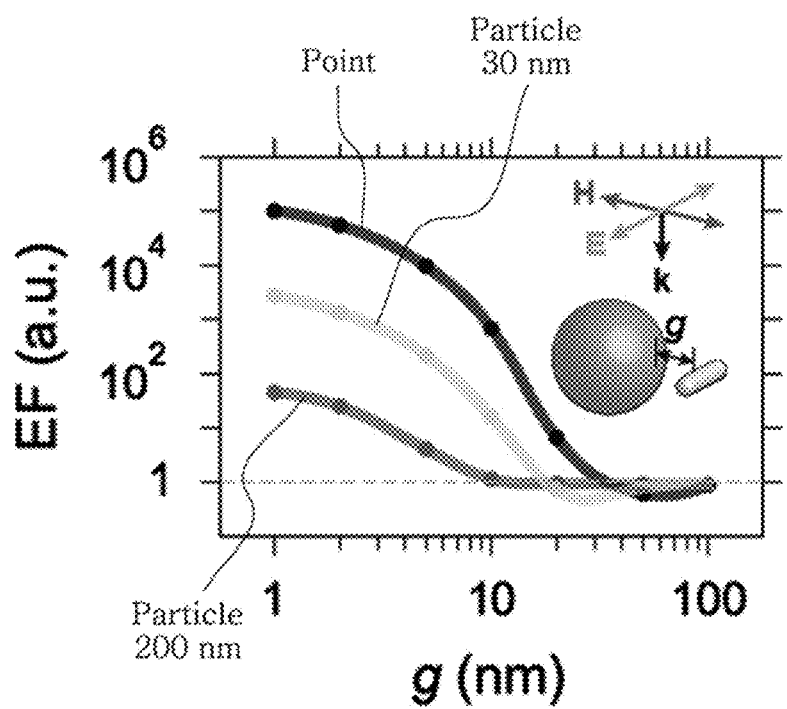
FIG. 4D shows a simulation result of calculating a surface-enhanced Raman scattering enhancement factor (EF) according to a distance (g) between a gold nanorod (GNR) and polystyrene (PS).

The gold nanorod (GNR) having the length of 35 nm and the thickness of 10 nm and the polystyrene (PS) of the size of 200 nm (concentration of 10 mg/L) were provided in advance in the collector of the vertical nanogap electrode in a ratio of 1:1, and then the alternating voltage of 2V with 10 kHz was applied. Then, SEM analysis was performed on the collector of the vertical nanogap electrode, and as shown in FIG. 4B, it was confirmed that the gold nanorods and the polystyrene (PS) were bonded to each other to form an aggregation on the collector of the vertical nanogap electrode (see FIG. 4B).

Figure 4E:
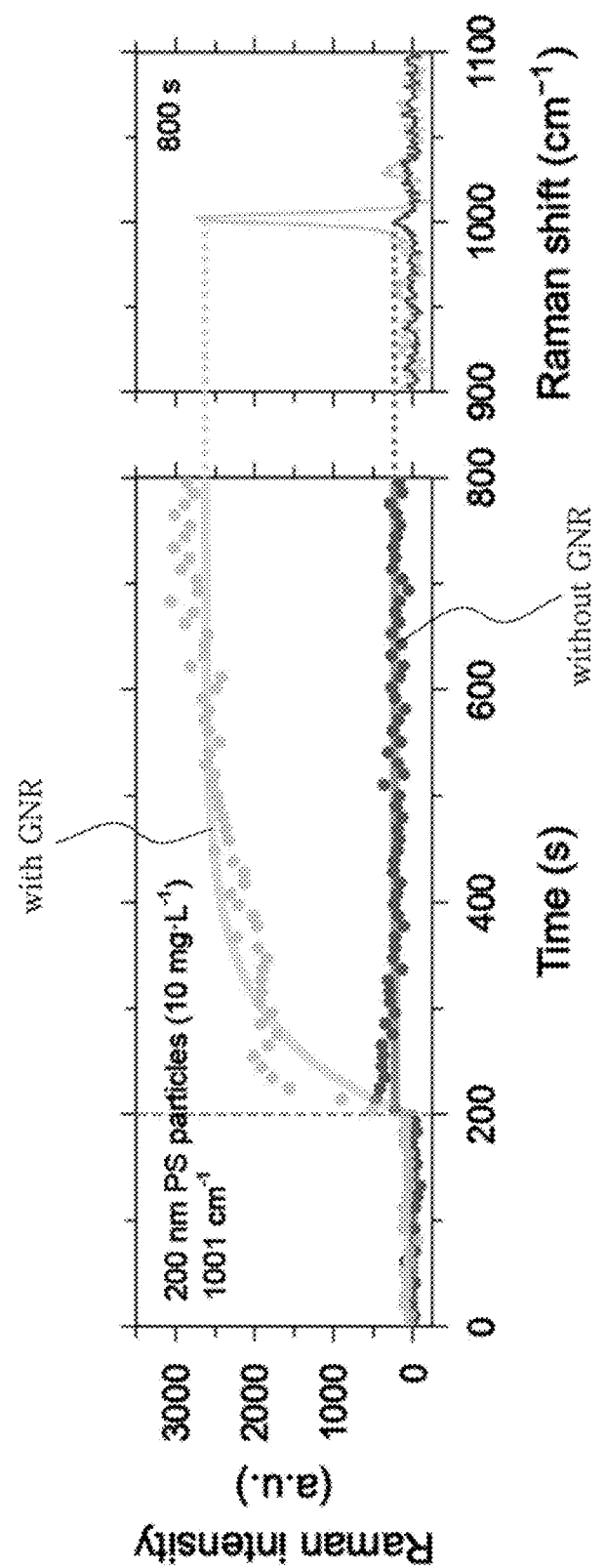
FIG. 4E shows an intensity of a Raman signal according to whether or not a gold nanorod (GNR) is applied.

In addition, as a result of analyzing the intensity of the Raman signal according to the presence or absence of the gold nanorod under the condition that the laser having the wavelength of 785 nm similar to the maximum absorption wavelength (778 nm) of the gold nanorod is applied during the Raman spectroscopy with the above conditions (see FIG. 4E), it was confirmed that the intensity of the Raman signal was improved when the gold nanorod was concentrated together.

Figure 4F:
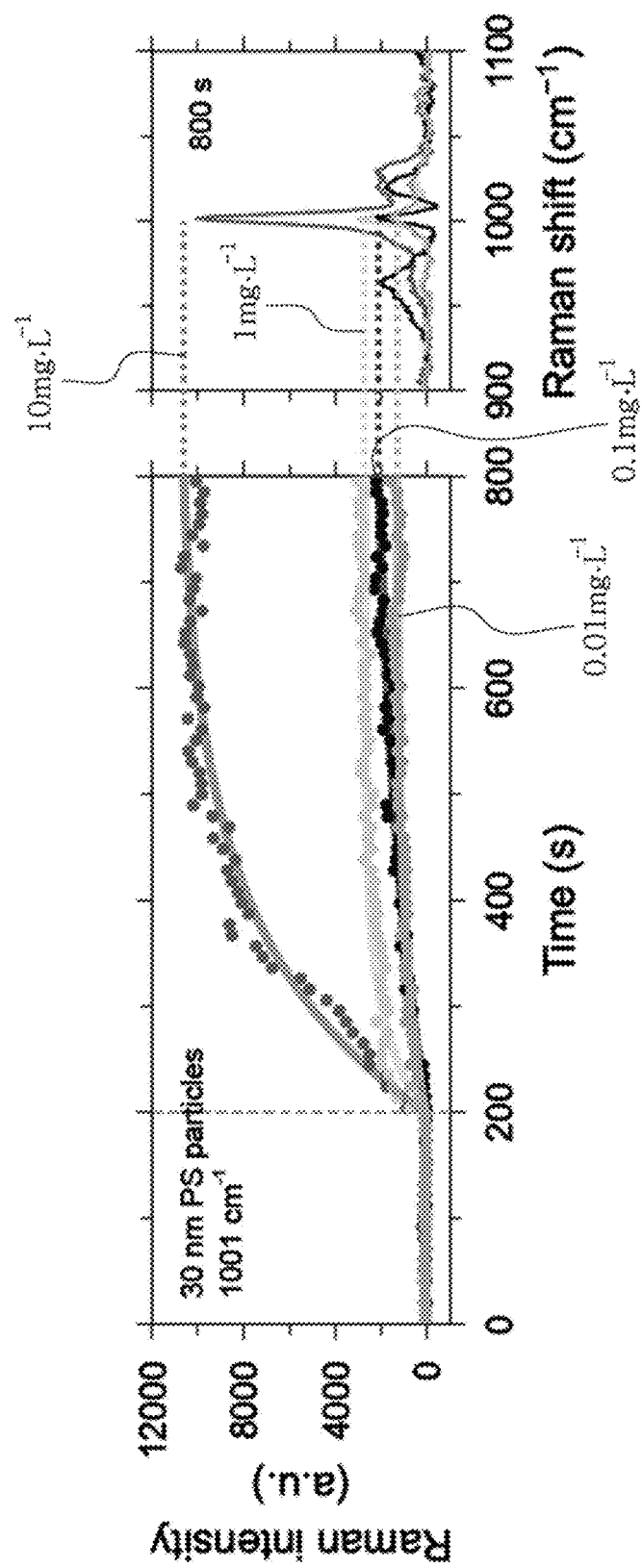
FIG. 4F shows an intensity of a Raman signal according to polystyrene (PS) concentration when a gold nanorod (GNR) is applied.

Furthermore, the AC voltage of 5V with the frequency of 10 kHz was applied to a solution in which the gold nanorod (GNR) was mixed with the polystyrene (PS) of 30 nm at the concentration of 10 mg/L, 1 mg/L, 0.1 mg/L, and 0.01 mg/L, respectively, and the concentration and the Raman spectroscopy were performed (see FIG. 4F). The detected intensity of the Raman signal was converted into the function of particle concentration and calculated through the Langmuir adsorption model. The limit of detection for the polystyrene (PS) having the size of 30 nm was estimated to be 1.17 μg/L (about 0.01 mg/L).

What is claimed is:

1. A method for detecting a nanoplastic using a vertical nanogap electrode and a Raman spectroscopic device, comprising:
   in a state where a vertical nanogap electrode is provided in aquatic environment in which a nanoplastic exists, forming a nanoplastic aggregate having a size larger than a laser wavelength of a Raman spectroscopic device, by applying an alternating voltage of a specific frequency to the vertical nanogap electrode to collect and concentrate the nanoplastic in a collector of the vertical nanogap electrode,
   irradiating the nanoplastic aggregate with the Raman spectroscopic device, and
   performing Raman spectroscopy on the nanoplastic aggregate concentrated in the collector of the vertical nanogap electrode to detect the nanoplastic constituting the nanoplastic aggregate,
   the alternating voltage and a frequency of the corresponding alternating voltage are controlled so that a local minimum point of potential energy acting on the vertical nanogap electrode is located in a central region of the collector of the vertical nanogap electrode,
   the local minimum point of the potential energy acting on the vertical nanogap electrode due to interaction between AC-electroosmosis (ACEO) and dielectrophoresis (DEP) is located in the central region of the collector of the vertical nanogap electrode,
   in the aquatic environment in which the nanoplastic exists, a minimum size of the nanoplastic is 200 nm, and a limiting of detection (LoM) of the nanoplastic is 4.66 mg/L.

2. The method according to claim 1, wherein a size of the nanoplastic is smaller than a wavelength of a laser to be irradiated, and the Raman spectroscopy is performed on the nanoplastic aggregate having a size larger than the wavelength of the laser to detect a molecular type of an individual nanoplastic constituting the nanoplastic aggregate.

3. The method according to claim 2, wherein the vertical nanogap electrode comprises a substrate, a first electrode stacked on an entire surface of the substrate, an insulation film and a second electrode sequentially stacked on the first electrode, the insulation film and the second electrode are removed to expose the first electrode to form the collector, and the alternating voltage of the specific frequency is applied to the first electrode and the second electrode.

4. The method according to claim 1, wherein a size of the nanoplastic aggregate is 1 μm or more.

5. The method according to claim 1, wherein the vertical nanogap electrode comprises a substrate, a first electrode stacked on an entire surface of the substrate, an insulation film and a second electrode sequentially stacked on the first electrode, the insulation film and the second electrode are removed to expose the first electrode to form the collector, and the alternating voltage of the specific frequency is applied to the first electrode and the second electrode.

6. A method for detecting a nanoplastic using a vertical nanogap electrode and a Raman spectroscopic device, comprising:
   in a state where a vertical nanogap electrode is provided in aquatic environment in which a nanoplastic exists, forming a nanoplastic aggregate having a size larger than a laser wavelength of a Raman spectroscopic device, by applying an alternating voltage of a specific frequency to the vertical nanogap electrode to collect and concentrate the nanoplastic in a collector of the vertical nanogap electrode,
   irradiating the nanoplastic aggregate with the Raman spectroscopic device, and
   performing Raman spectroscopy on the nanoplastic aggregate concentrated in the collector of the vertical nanogap electrode to detect the nanoplastic constituting the nanoplastic aggregate,
   wherein the alternating voltage and a frequency of the corresponding alternating voltage are controlled so that a local minimum point of potential energy acting on the vertical nanogap electrode is located in a central region of the collector of the vertical nanogap electrode,
   the local minimum point of the potential energy acting on the vertical nanogap electrode due to interaction between AC-electroosmosis (ACEO) and dielectrophoresis (DEP) is located in the central region of the collector of the vertical nanogap electrode
   a SERS (Surface-Enhanced Raman Scattering) particle is provided in advance in the collector of the vertical nanogap electrode, and when the alternating voltage of the specific frequency is applied to the vertical nanogap electrode, the SERS particle forms the aggregate together with the nanoplastic, the Raman spectroscopy is performed on the aggregate to detect the nanoplastic constituting the nanoplastic aggregate,
   wherein in the aquatic environment in which the nanoplastic exists, a minimum size of the nanoplastic is 30 nm, and a limit of detection (LoM) of the nanoplastics is 0.01 mg/L.

* * * * *